US008854685B2

(12) United States Patent
Nakaso

(10) Patent No.: US 8,854,685 B2
(45) Date of Patent: Oct. 7, 2014

(54) IMAGE FORMING DEVICE THAT DETECTS AN UNDECODABLE IMAGE PORTION

(75) Inventor: Suguru Nakaso, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 196 days.

(21) Appl. No.: 13/547,406

(22) Filed: Jul. 12, 2012

(65) Prior Publication Data

US 2013/0222820 A1  Aug. 29, 2013

(30) Foreign Application Priority Data

Feb. 27, 2012  (JP) ................................. 2012-040673

(51) Int. Cl.
H04N 1/00 (2006.01)
(52) U.S. Cl.
USPC ............. 358/1.6; 358/1.2; 358/1.9; 358/1.12; 358/1.13; 358/1.14; 358/1.15; 358/3.06; 358/3.28; 358/3.3; 347/171; 347/212; 347/213; 399/341; 399/342
(58) Field of Classification Search
None
See application file for complete search history.

(56) References Cited

U.S. PATENT DOCUMENTS

| | | | | |
|---|---|---|---|---|
| 8,643,910 B2 * | 2/2014 | Ichikawa | ...................... | 358/443 |
| 2001/0001472 A1 * | 5/2001 | Sano et al. | ............... | 235/462.01 |
| 2002/0030842 A1 * | 3/2002 | Iida | ............................... | 358/1.14 |
| 2006/0256369 A1 * | 11/2006 | Mitamura | ..................... | 358/1.15 |
| 2007/0019245 A1 * | 1/2007 | Katsurabayashi | ............ | 358/3.28 |
| 2011/0063642 A1 * | 3/2011 | Greim | ............................ | 358/1.9 |
| 2012/0127493 A1 * | 5/2012 | Yokoi et al. | .................... | 358/1.9 |
| 2012/0229872 A1 * | 9/2012 | Dolev | ........................... | 358/448 |

FOREIGN PATENT DOCUMENTS

| | | |
|---|---|---|
| JP | A 9-185669 | 7/1997 |
| JP | B2 2833975 | 12/1998 |
| JP | A 2003-511762 | 3/2003 |
| JP | A 2004-152273 | 5/2004 |
| JP | A 2005-161787 | 6/2005 |
| JP | A 2009-209297 | 9/2009 |
| JP | A 2010-191995 | 9/2010 |

* cited by examiner

Primary Examiner — Miya J Cato
(74) Attorney, Agent, or Firm — Oliff PLC

(57) ABSTRACT

Provided is an image determination device including a sheet detecting unit that detects a sheet on which a code image is printed, a first acquiring unit that acquires information on the code image and an absorption wavelength of the code image, a second acquiring unit that acquires a reading unit necessary for decoding a code portion of the code image, a third acquiring unit that acquires a document image of an electronic document, a dividing unit that divides the document image into plural blocks corresponding to the reading unit, a detecting unit that detects a block in which an image portion of the document image that uses a color having an absorption band at the absorption wavelength of the code image overlaps with the code portion of the code image as an undecodable block, and an output unit that outputs a warning indicating the generation of an undecodable area.

12 Claims, 20 Drawing Sheets

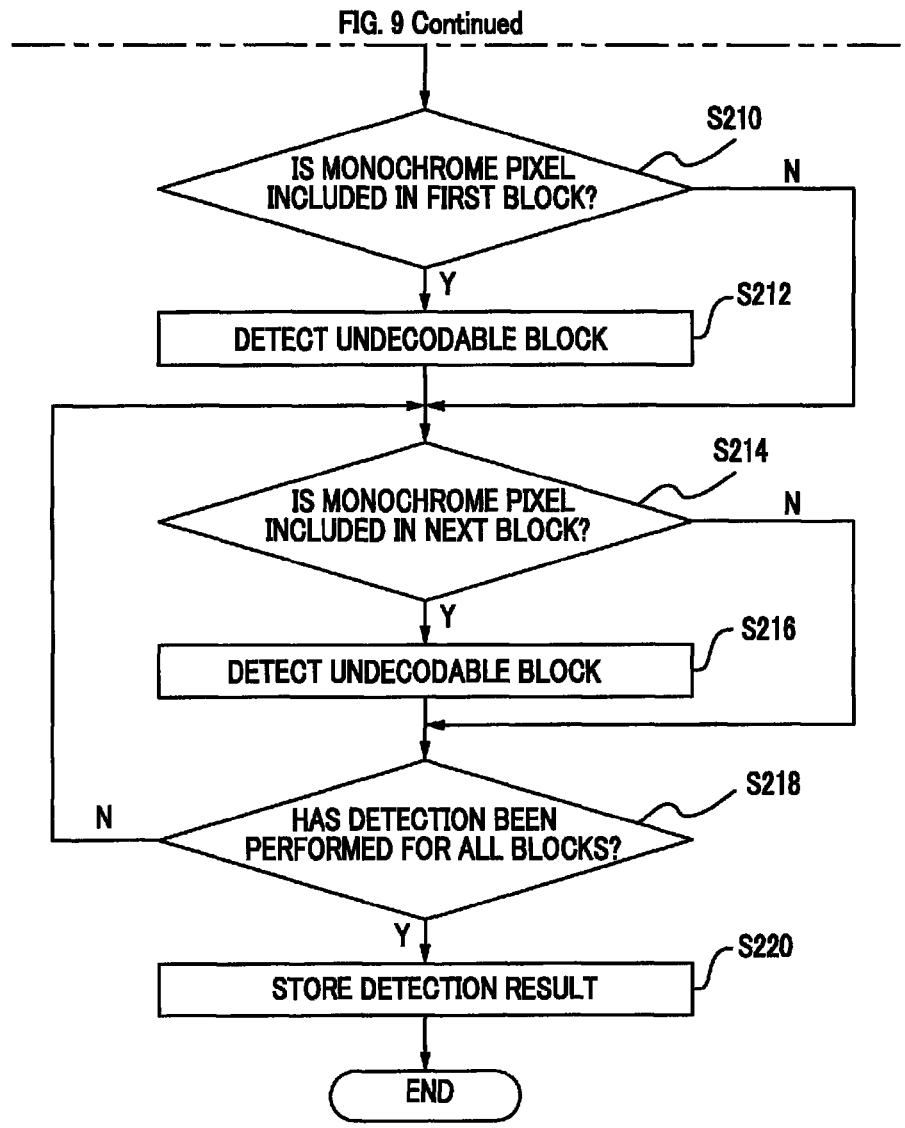

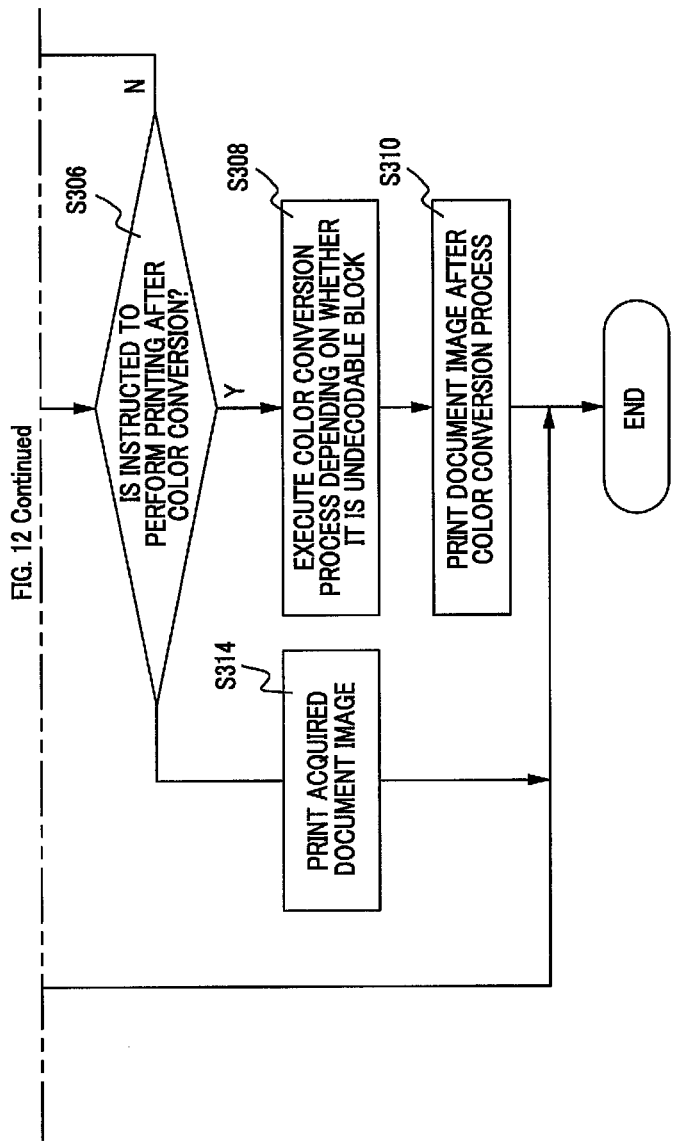

IMAGE FORMING DEVICE THAT DETECTS AN UNDECODABLE IMAGE PORTION

CROSS-REFERENCE TO RELATED APPLICATIONS

This application is based on and claims priority under 35 USC 119 from Japanese Patent Application No. 2012-040673 filed Feb. 27, 2012.

BACKGROUND

Technical Field

The present invention relates to an image determination device and an image forming apparatus.

SUMMARY

According to an aspect of the invention, there is provided an image determination device including: a sheet detecting unit that detects a sheet on which a code image is printed from sheets supplied to a transport path to form an image thereon; a first acquiring unit that acquires information on the code image printed on the sheet and an absorption wavelength of the code image; a second acquiring unit that acquires a reading unit necessary for decoding a code portion of the code image; a third acquiring unit that acquires a document image of an electronic document serving as an image formation target; a dividing unit that divides the document image acquired by the third acquiring unit into a plurality of blocks corresponding to the reading unit based on the reading unit of the code image acquired by the second acquiring unit; a detecting unit that detects a block in which an image portion of the document image that uses a color having an absorption band at the absorption wavelength of the code image overlaps with the code portion of the code image as an undecodable block based on the information of the code image acquired by the first acquiring unit; and an output unit that outputs a warning indicating the generation of an undecodable area based on a result of the detection by the detecting unit.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention will be described in detail with reference to the drawings.

Image Forming System

First, an example of an image forming system according to a present exemplary embodiment will be described.

Figure 1:
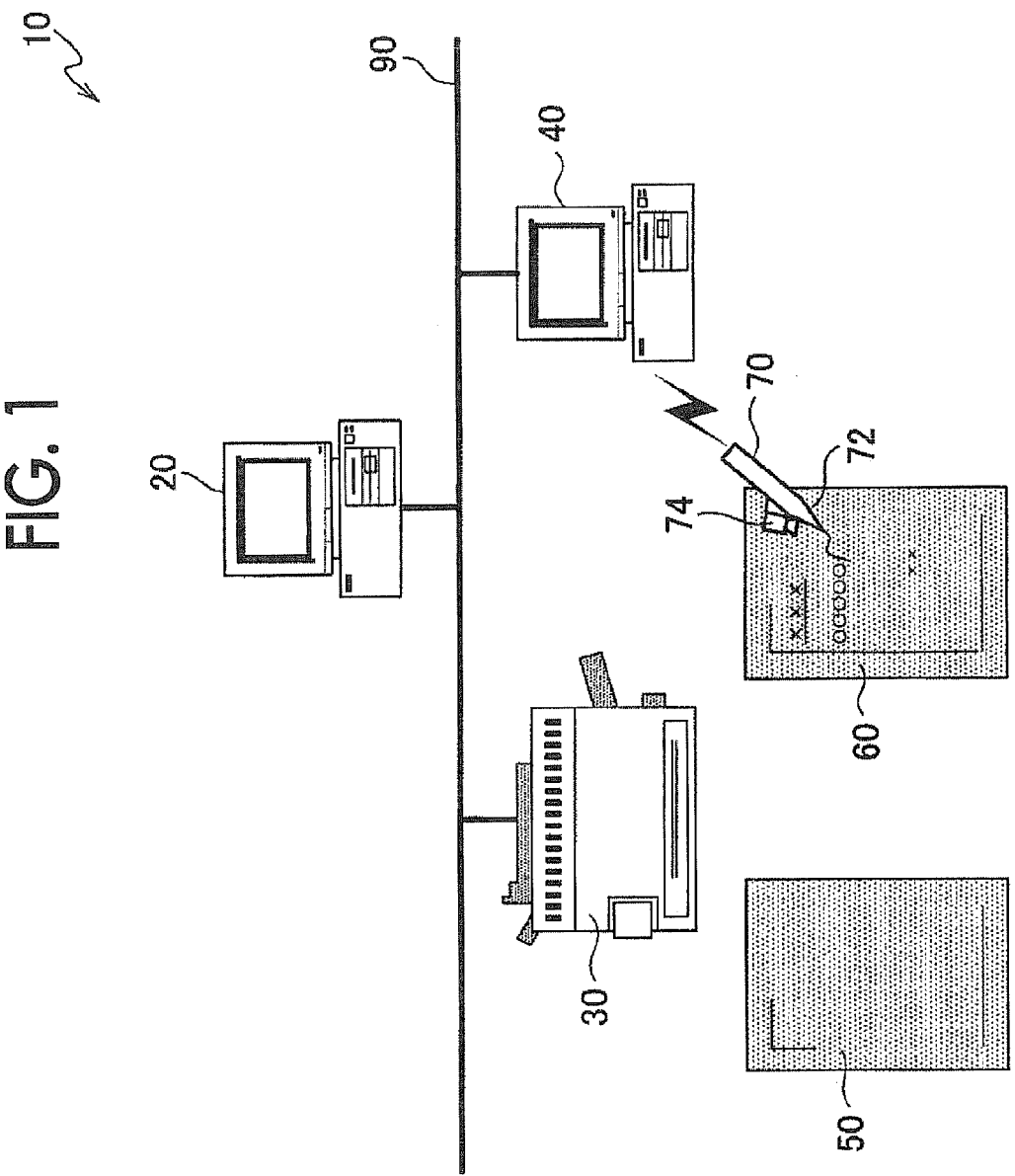
FIG. 1 is a schematic view illustrating an overall configuration of an image forming system.

FIG. 1 is a schematic view illustrating an overall configuration of an image forming system. As illustrated in FIG. 1, the image forming system 10 includes a terminal device 20, an image forming apparatus 30, and a document management server 40. The terminal device 20, the image forming apparatus 30, and the document management server 40 are connected by a communication circuit 90 such as a local area network (LAN) The terminal device 20 is an information processing device such as a computer used by a user and a peripheral device. The image forming apparatus 30 is a printing apparatus that forms an image of a sheet. The document management server 40 is an information processing device such as a computer that manages an electronic document. The configuration of the image forming system is an example and is not limited to this.

For example, the terminal device 20 acquires an electronic document from the document management server 40 and instructs the image forming apparatus 30 to print the electronic document. The image forming apparatus 30 forms a document image of the electronic document on a sheet 50 in accordance with the print instruction from the terminal device 20 and outputs a printed material 60 on which the document image is formed. The terminal device 20 may acquire an electronic document from a storage unit of the terminal device 20. Moreover, the terminal device 20 may acquire an electronic document from an external device other than the document management server 40 via a communication unit of the terminal device 20. Alternatively, the image forming apparatus 30 may read a document image on a document with the aid of an image reading unit of the image forming apparatus 30 and form the read document image on the sheet 50.

In the present exemplary embodiment, when the image forming apparatus 30 forms a document image, there is a case where the sheet 50 on which a code image is printed in advance is used instead of a normal sheet. In the following description, a sheet on which a code image is printed in advance is referred to as a "code embedded sheet 50" and is distinguished from a normal sheet.

A code image is an image including code information which represents specific information according to a code pattern (code). As a code pattern (code), a one-dimensional code such as a barcode, a two-dimensional code such as a QR code (registered trademark) a glyph code, or the like may be used. The specific information is decoded by reading the code pattern of a code image. In the present exemplary embodiment, an example in which code information such as positional information representing the position on a sheet and identification information for identifying a sheet is embedded in a code image will be described. Details of the code image will be described later.

For example, the code image may be an infrared image formed using an infrared absorbing material. Here, "infrared image" is an image which is difficult to visually perceive under natural light or white light and which is read by irradiating infrared light and detecting reflected infrared light. In reading an infrared image, an infrared-dedicated photographic device such as an infrared camera is used. As an infrared absorbing material, a material having light absorption peaks in an infrared range of wavelengths of 750 nm to 1000 nm is used. Thus, in reading an infrared image, infrared light having a wavelength corresponding to the absorption characteristics of an infrared absorbing material is used. An existing material is appropriately selected as such an infrared absorbing material. For example, a material disclosed in JP-A-2009-209297 may be used.

The image forming apparatus 30 forms a document image (visible image) on the code embedded sheet 50 using a printing colorant having absorption in a visible range such as ink or toner that produces colors of cyan (C-color), magenta (M-color), yellow (Y-color), and black (K-color). Thus, when a code image is an infrared image, a printed material 60 in which a document image which is a visible image is superimposed on a code image which is an infrared image is generated. A black colorant that produces a black color (K-color) includes carbon black and absorbs infrared light similarly to an infrared absorbing material.

When a document image includes a black image portion and the black image portion is formed using a black colorant, a black image is superimposed on a code image. In a portion in which a black image is superimposed on a code image, the code image and code information are not readable, and such a portion is referred to as an "undecodable area" where the specific information is not decodable.

The same problem occurs even when the code image is not an infrared image. When a code image is formed using a colorant having a predetermined absorption wavelength, and an image portion that uses a color having an absorption band at the same absorption wavelength is superimposed on the code image, the image portion becomes an "undecodable area" where the code image is not readable. For example, when a code image is a blue image formed using a C-colorant, and a document image is formed in "blue" or "black" having an absorption band at the absorption wavelength of the C-colorant, it is not possible to read the code image. The relationship between the color of a colorant that forms a code image and the color that makes reading of the code image impossible is illustrated in Table 1 as below.

TABLE 1

| Colorant That Forms Code Image | Color That Makes Reading Of Code Image Impossible |
| --- | --- |
| Infrared Absorbing Material | Black (Excluding CMY Black that is formed of C-colorant, M-colorant and Y-colorant) |
| K (Black)-Colorant | Black (Excluding CMY Black that is formed of C-colorant, M-colorant and Y-colorant) |
| C-Colorant | C-Color, Black (Including CMY Black that is formed of C-colorant, M-colorant and Y-colorant)) |
| Y-Colorant | Y-Color, Black (Including CMY Black that is formed of C-colorant, M-colorant and Y-colorant)) |
| M-Colorant | M-Color, Black (Including CMY Black that is formed of C-colorant, M-colorant and Y-colorant)) |
| C-Colorant + Y-Colorant (G-Color/Green) | C-Color, Y-Color, Black (Including Black that is formed of C-colorant, M-colorant and Y-colorant)) |
| Y-Colorant + M-Colorant (R-Color/Red) | Y-Color, M-Color, Black (Including Black that is formed of C-colorant, M-colorant and Y-colorant)) |
| M-Colorant + C-Colorant (B-Color/Blue) | M-Color, C-Color, Black (Including Black that is formed of C-colorant, M-colorant and Y-colorant)) |

In the present exemplary embodiment, before the image forming apparatus 30 forms a document image, the code embedded sheet 50 is detected in a sheet transport path. When the code embedded sheet 50 is detected, a "printability checking process" described later is executed. Moreover, when it is predicted that an undecodable area will be generated in the printed material 60, a warning message indicating "undecodable area will be generated" is sent to a user. Moreover, a decision such as to execute or stop formation of a document image is received from the user. For example, options may be displayed on a setting screen, and the user's decision may be received. The setting screen is displayed on an operation display unit of the image forming apparatus 30. Whether formation of a document image will be executed or stopped is selected by the user operating the operation display unit. Alternatively, options may be informed via an audio guide, for example, and the user's decision may be received.

Moreover, a pen-type device 70 may be used in reading a code image from the printed material 60. The pen-type device 70 includes a pen tip 72 used for writing on the printed material 60, a capturing unit 74 that captures a code image around the pen tip 72, an information processing unit (not illustrated) that decodes positional information from the captured code image to acquire handwritten information, a storage unit (not illustrated) that stores the positional information or the handwritten information, and a communication unit (not illustrated) that communicates with an external device via radio communication or the like.

For example, when a user writes on the printed material 60 using the pen-type device 70, the handwritten information is acquired by the pen-type device 70 and transmitted to the document management server 40. The handwritten information on the printed material 60 is managed in correlation with an electronic document printed on the printed material 60 by the document management server 40.

Code Embedded Sheet

Next, a code embedded sheet used in the present exemplary embodiment will be described.

Figure 2A:
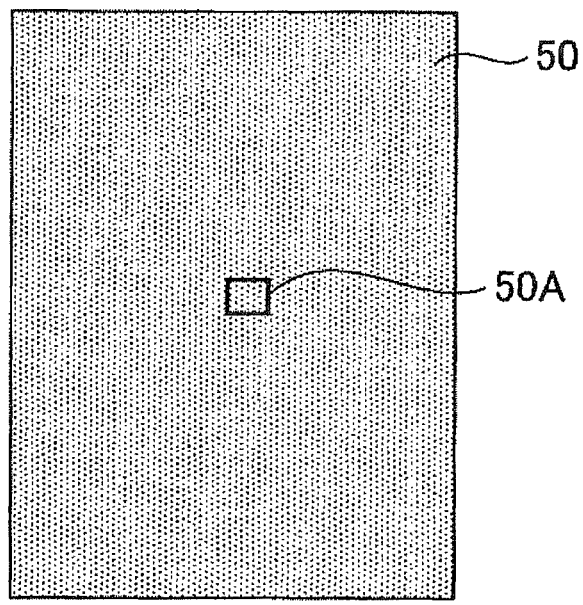
FIG. 2A is a plan view illustrating an entire image of a code embedded sheet.

FIG. 2A is a plan view illustrating an entire image of the code embedded sheet 50. As illustrated in FIG. 2A, in the present exemplary embodiment, a code image (depicted by a dot pattern) is printed on the entire surface of the code embedded sheet 50 so that the code image may be read from any position of the entire sheet. The code image may be embedded in a specific area such as an image formation area where an image is formed by the image forming apparatus 30, or a peripheral area around the image formation area. Moreover, the code image may be embedded in both the front and back surfaces of the code embedded sheet 50.

Figure 2B:
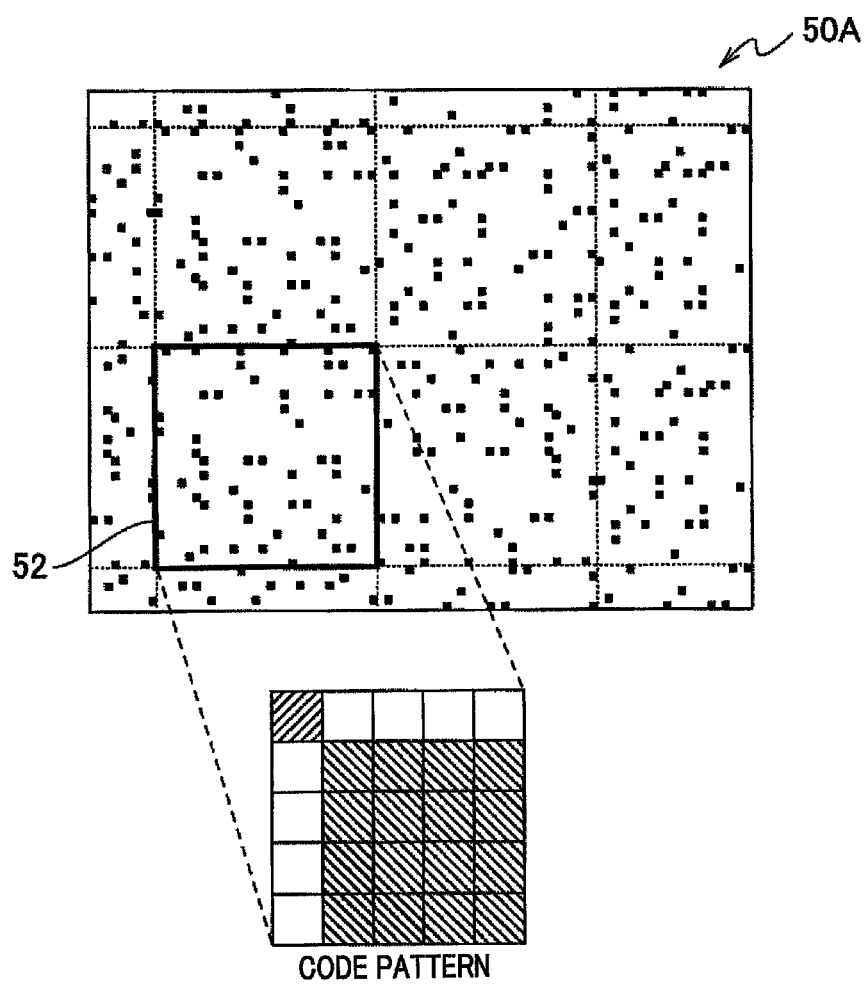
FIG. 2B is a partially enlarged view illustrating a portion of the surface of the code embedded sheet at an enlarged scale.

FIG. 2B is a partially enlarged view illustrating a portion 50A of the surface of the code embedded sheet 50 at an enlarged scale. As illustrated in FIG. 2B, in the code image, a two-dimensional code (dot pattern) in which plural dots are arranged in a two-dimensional form is used as a code pattern. Here, "dots" are portions which are printed using an infrared absorbing material that forms an infrared image, and are expressed by black rectangles (■) in FIG. 2B.

Moreover, the code image is configured to include plural code patterns 52 which are arranged in a two-dimensional form. The code pattern 52 is the reading unit necessary for decoding specific information such as positional information or identification information. For example, in the case of QR codes (registered trademark), the code pattern 52 corresponds to one QR code (registered trademark). The specific information is decoded for each code pattern 52. In other words, when it is not possible to read a portion of the code pattern 52, it is not possible to decode the specific information corresponding to the code pattern 52. In the present exemplary embodiment, the code pattern 52 includes plural unit patterns 54, and the specific information corresponding to the code pattern 52 is decoded by reading the respective plural unit patterns 54 (see FIGS. 3 and 4).

Figure 3:
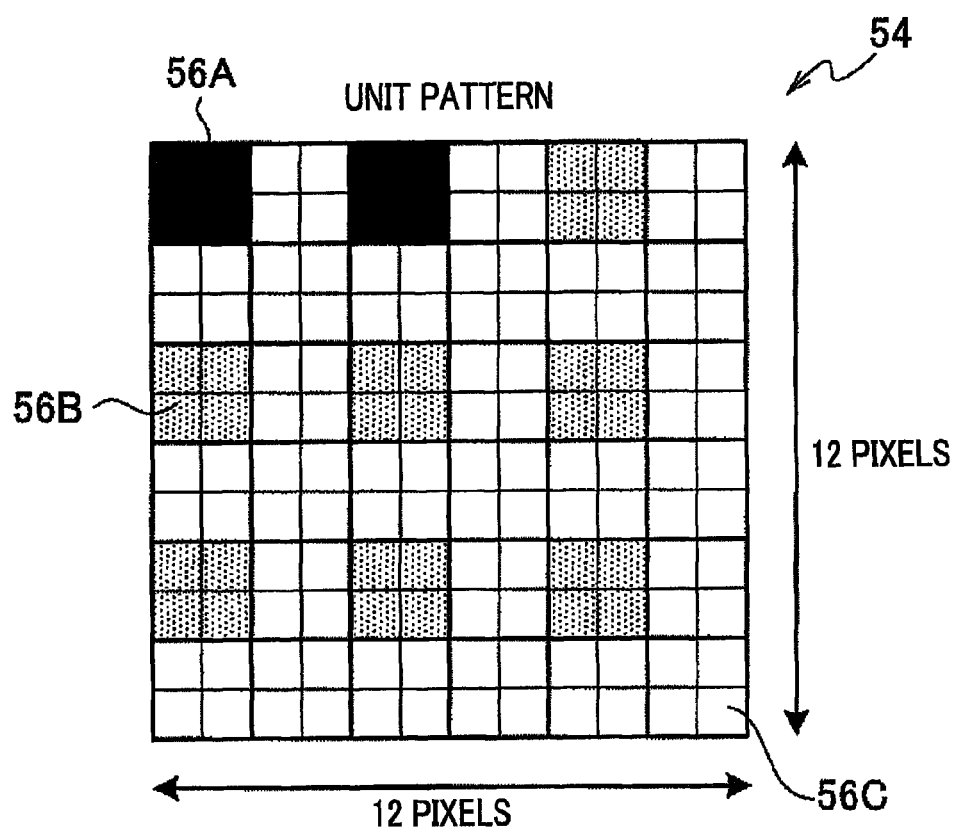
FIG. 3 is a schematic view illustrating an example of a unit pattern constituting a code image.

FIG. 3 is a schematic view illustrating an example of the unit pattern 54 constituting a code image. The unit pattern 54 is a minimum unit that constitutes the code pattern 52 and expresses information of one bit or plural bits. As illustrated in FIG. 3, the unit pattern 54 is divided into a dot arrangement area (black area 56A and gray area 56B) where dots are arranged and a non-dot arrangement area (a white area 56C) where no dots are arranged. The black area 56A shows that dots are arranged in the dot arrangement area. The gray area 56B shows that dots are not arranged in the dot arrangement area.

In the example illustrated in FIG. 3, nine dot arrangement areas are provided in the unit pattern 54. Dots are arranged in two areas selected from these nine areas. Since there are 36 combinations ($=_9C_2$) of selecting two areas from nine areas, there are 36 unit patterns 54. The unit pattern 54 is referred to as a "$_9C_2$ pattern." For example, information of 5 bits is expressed by using 32 unit patterns 54 among all of the unit patterns 54. Moreover, in the example illustrated in FIG. 3, the size of the unit pattern 54 is "12 pixels by 12 pixels." Moreover, the size of each of the dot arrangement area (the black area 56A and the gray area 56B) and the non-dot arrangement area (the white area 56C) is "2 pixels by 2 pixels."

For example, when a code image having the above unit pattern 54 is printed using an image forming apparatus having a resolution of 600 dpi (a resolution capable of printing 600 pixels per inch), the size of one pixel is "42.3 μm by 42.3 μm." Thus, the size of one dot of the unit pattern 54 is "84.6μm by 84.6 μm." Although the amount of information per unit area increases as the size of one dot decreases, reading accuracy decreases if the size of one dot is too small. The size of one dot that constitutes the unit pattern 54 may be set such that the length (diameter) of one side is in the range of 50 μm to 100 μm, taking the amount of information to be expressed, reading accuracy, and the resolution of an image forming apparatus into consideration.

Figure 4:
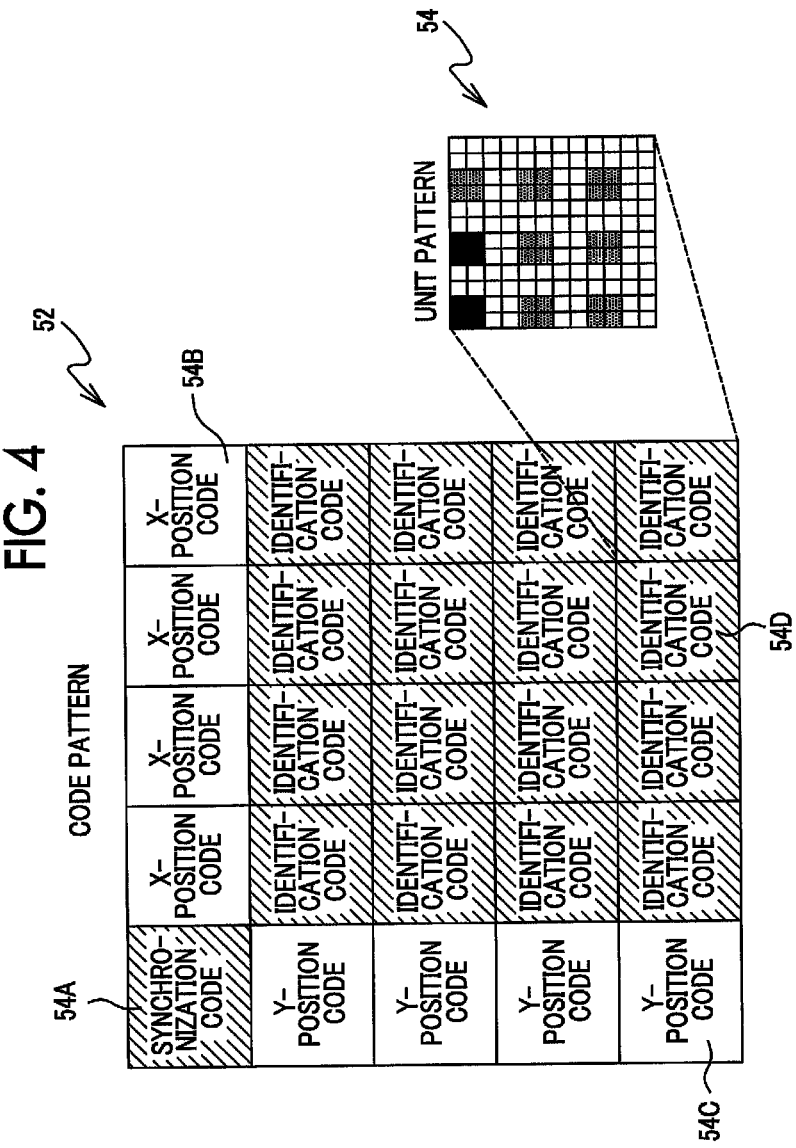
FIG. 4 is a schematic view illustrating an example of a layout of unit patterns in a code pattern.

FIG. 4 is a schematic view illustrating an example of the layout of the unit patterns 54 in the code pattern 52. The code pattern 52 is made up of plural unit patterns 54 arranged in a two-dimensional form. Here, the position where the unit pattern 54 is disposed is referred to as a "unit block." In the example illustrated in FIG. 4, 25 (=5×5) unit blocks are arranged. The unit patterns 54 are disposed in the respective 25 unit blocks. As described above, there are 36 unit patterns 54. In the example illustrated in FIG. 4, four unit patterns 54 are used as a synchronization code for detecting rotation of an image, and the remaining 32 unit patterns 54 are used as an identification code or a position code.

In the layout illustrated in FIG. 4, a synchronization code 54A is disposed in the unit block at the top-left corner of the code pattern 52. X-position codes 54B representing the X coordinates are disposed in four unit blocks arranged to the right side of the synchronization code 54A. Y-position codes 54C representing Y coordinates are disposed in four unit blocks arranged to the lower side of the synchronization code 54A. Moreover, identification codes 54D are disposed in 16 (=4×4) unit blocks in a region surrounded by the X-position codes 54B and the Y-position codes 54C. FIG. 4 illustrates an example of the layout of the unit patterns 54, and each of the synchronization code 54A, the X-position code 54B, the Y-position code 54C, and the identification code 54D is substituted with the unit pattern 54.

Here, the principle of decoding in respective code pattern units will be described briefly.

Figure 5:
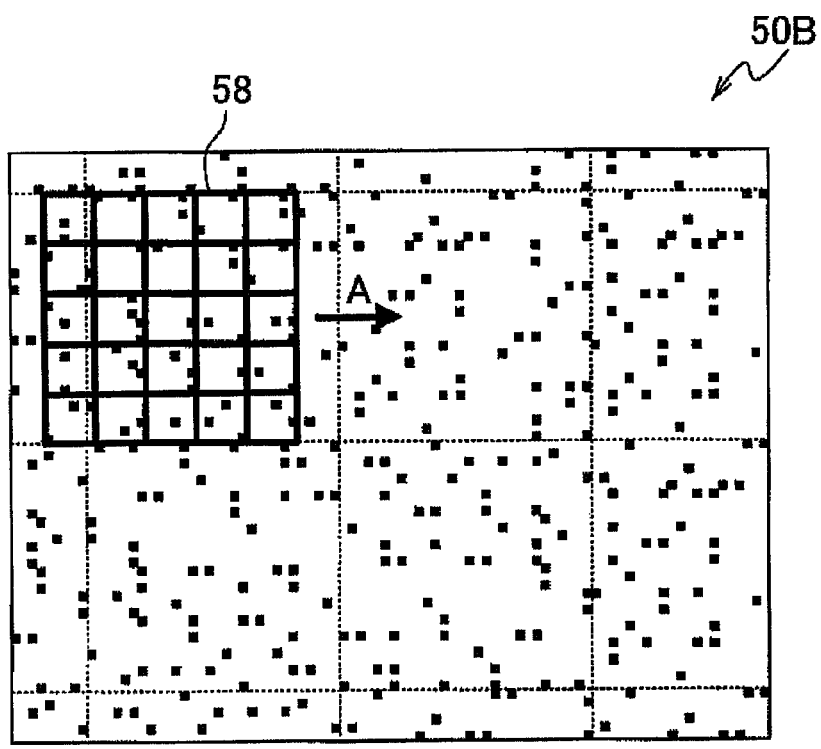
FIG. 5 is a schematic view for explaining the principle of decoding specific information from a code image.

FIG. 5 is a schematic view for explaining the principle of decoding specific information from a code image. As illustrated in FIG. 5, a frame 58 having the same size as a code pattern 52 is superimposed on a dot arrangement 50B read from a portion 50A of a code image. The frame 58 has plural openings having the same size as unit blocks. The plural openings are arranged in the same layout as unit blocks. The position of the frame 58 is adjusted so that the number of dots in each opening becomes 2 while moving the frame 58 in relation to the dot arrangement 50B. In this way, a dot arrangement corresponding to one code pattern 52 is detected.

When the dot arrangement corresponding to the code pattern 52 is detected, the synchronization code 54A is detected within the detected dot arrangement, and rotation of an image is determined. The dot arrangement is rotated in accordance with the determination result so that the dot arrangement is set in a proper direction. In this way, a normal dot arrangement in which unit patterns 54 are arranged in the same layout as the code patterns 52 is acquired. Subsequently, the unit patterns 54 corresponding to the X-position code 54B, the Y-position code 54C, and the identification code 54D are detected from the acquired normal dot arrangement, whereby positional information and identification information are decoded.

When a decoding process for one code pattern 52 ends, the frame 58 is moved in the direction indicated by arrow A in relation to the dot arrangement 50B to detect a dot arrangement corresponding to the next code pattern 52. This process is repeatedly performed to decode positional information and identification information from the next code pattern 52. In this way, positional information and identification information are decoded for each code pattern 52. The frame 58 is moved in the order of reading the code patterns 52. For example, when handwritten information is acquired using the pen-type device 70, the moving direction of the frame 58 is the moving direction of the pen tip 72.

Configuration of Image Forming Apparatus

Figure 6A:
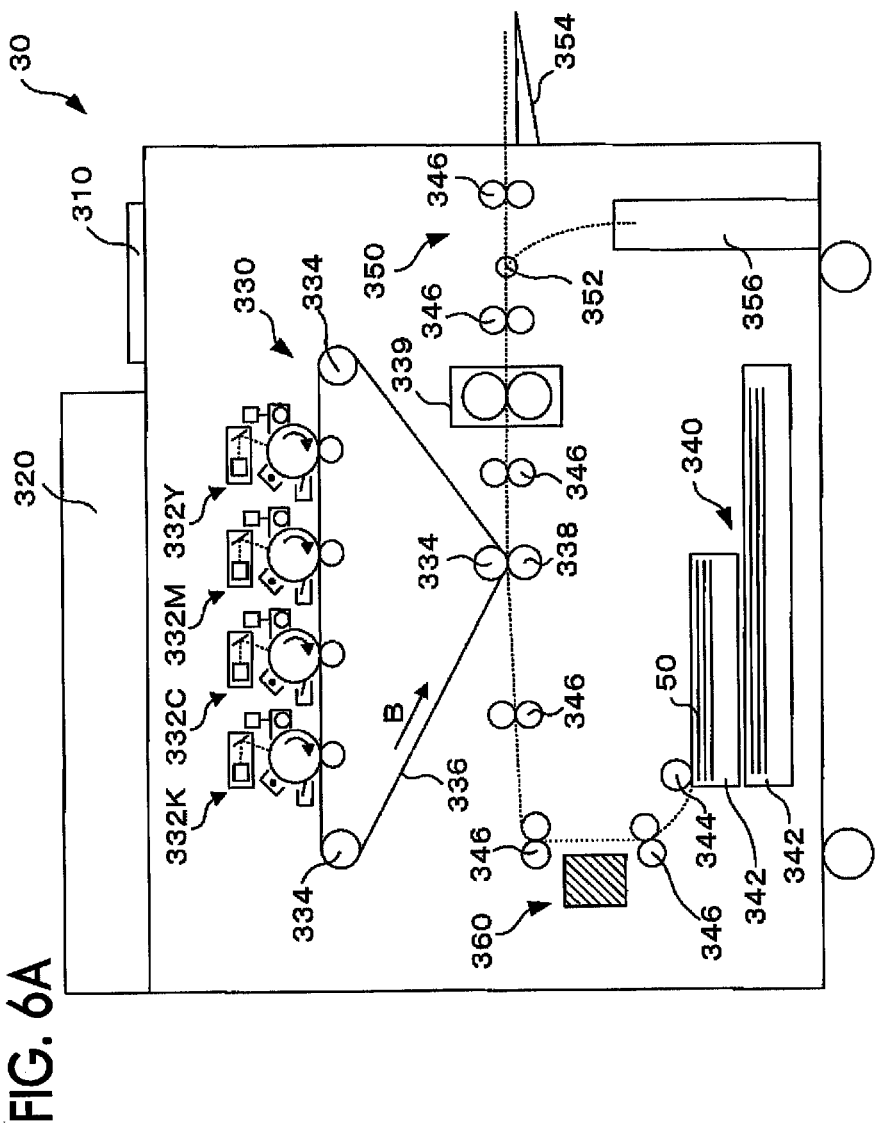
FIG. 6A is a schematic configuration view illustrating an example of a configuration of an image forming apparatus.
Figure 6B:
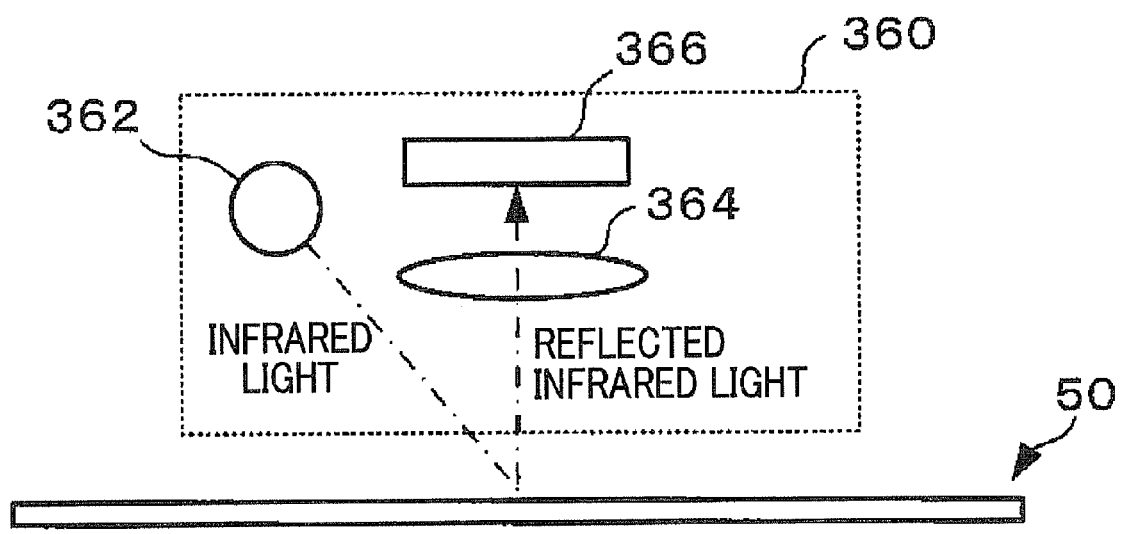
FIG. 6B is a schematic configuration view illustrating an example of a configuration of a specific sheet detecting unit.

Next, an example of the configuration of the image forming apparatus 30 will be described. In the present exemplary embodiment, an electrophotographic image forming apparatus that forms an image on a sheet using an electrophotographic developer (including toner) will be described. FIG. 6A is a schematic configuration view illustrating an example of the configuration of an image forming apparatus. FIG. 6B is a schematic configuration view illustrating an example of the configuration of a specific sheet detecting unit. Moreover, FIG. 7 is a block diagram illustrating an electrical configuration of the image forming apparatus.

Figure 7:
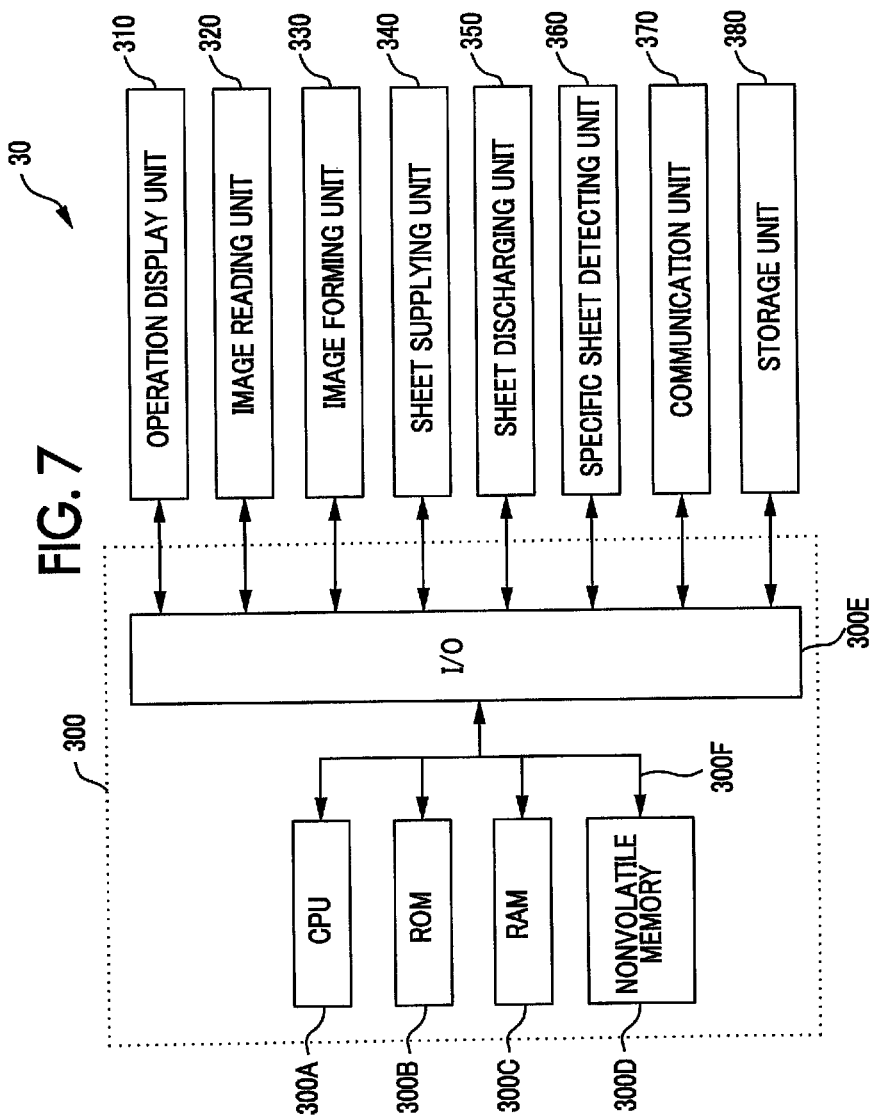
FIG. 7 is a block diagram illustrating an electrical configuration of the image forming apparatus.

As illustrated in FIGS. 6A and 7, the image forming apparatus 30 according to the present exemplary embodiment includes a control unit 300, an operation display unit 310, an image reading unit 320, an image forming unit 330, a sheet supply unit 340, a sheet discharge unit 350, a specific sheet detecting unit 360, a communication unit 370, and a storage unit 380. The image forming unit 330, the sheet supply unit 340, the sheet discharge unit 350, and the specific sheet detecting unit 360 are disposed along a sheet transport path depicted by a dotted line in the order of the sheet supply unit 340, the specific sheet detecting unit 360, the image forming unit 330, and the sheet discharge unit 350.

The specific sheet detecting unit 360 is a detecting unit that detects the code embedded sheet 50, the details of which will be described later. The specific sheet detecting unit 360 is disposed between the sheet supply unit 340 and the image forming unit 330. When a sheet supplied from the sheet supply unit 340 is the code embedded sheet 50, the code embedded sheet 50 is detected by the specific sheet detecting unit 360 before an image is formed by the image forming unit 330. For example, the specific sheet detecting unit 360 may be configured as an image reading device that reads an infrared image.

In this case, the code embedded sheet 50 is detected by reading the code image (infrared image). As described later, although the code embedded sheet 50 may be detected based on print parameters, since the specific sheet detecting unit 360 detects a sheet that is actually supplied to the sheet transport path, the code embedded sheet 50 is reliably detected when sheets are manually supplied one by one. A detailed configuration of the specific sheet detecting unit 360 will be described later.

The control unit 300 is configured as a computer that performs control of the entire apparatus and various computations. That is, the control unit 300 includes a central processing unit (CPU) 300A, a read only memory (ROM) 300B that stores various programs, a random access memory (RAM) 300C used as a work area when a program is executed, a nonvolatile memory 300D storing various types of information, and an input/output interface (I/O) 300E. The CPU 300A, the ROM 300B, the RAM 300C, the nonvolatile memory 300D, and the I/O 300E are connected via a bus 300F.

The operation display unit 310, the image reading unit 320, the image forming unit 330, the sheet supply unit 340, the sheet discharge unit 350, the specific sheet detecting unit 360, the communication unit 370, and the storage unit 380 are connected to the I/O 300E of the control unit 300. The control unit 300 controls the respective units of the operation display unit 310, the image reading unit 320, the image forming unit 330, the sheet supply unit 340, the sheet discharge unit 350, the specific sheet detecting unit 360, the communication unit 370, and the storage unit 380. Moreover, the control unit 300 acquires the detection result of the code embedded sheet 50 from the specific sheet detecting unit 360. The image forming apparatus 30 includes plural transport rollers 346. The plural transport rollers 346 are disposed along the sheet transport path depicted by a dotted line. The plural transport rollers 346 transport sheets in accordance with an image forming operation.

The operation display unit 310 is configured to include various buttons such as a start button and a number pad and a touch panel for displaying various screens such as a warning screen and a setting screen described later. The operation display unit 310 receives the user's operations and displays various types of information to the user using the above-mentioned configuration. The image reading unit 320 is configured to include an image reading device such as a CCD image sensor for optically reading an image formed on a sheet and a scanning mechanism for scanning a sheet. The image reading unit 320 reads an image on a document sheet placed on the image reading unit 320 and generates image information using the above-mentioned configuration.

The image forming unit 330 forms an image on a sheet using an electrophotographic method. In this example, a so-called tandem and intermediate transfer image forming unit is illustrated. The image forming unit 330 includes an image forming unit 332K that forms a K-toner image, an image forming unit 332C that forms a C-toner image, an image forming unit 332M that forms an M-toner image, and an image forming unit 332Y that forms a Y-toner image. Moreover, the image forming unit 330 is configured to include an intermediate transfer belt 336 that is wound around plural rollers 334 so as to move in the direction indicated by arrow B, a secondary transfer device 338 that transfers the toner images on the intermediate transfer belt 336 onto a sheet at a time, and a fixing device 339 that fixes the secondarily transferred toner images.

The image forming units 332K, 332C, 332Y, and 332M are disposed in the illustrated order so that toner images are formed on the intermediate transfer belt 336 in the order of Y, M, C, and K-toner images when the intermediate transfer belt 336 is moved in the direction indicated by arrow B. In the following description, the image forming units will be collectively referred to as the image forming unit 332 when it is not necessary to distinguish the respective colors. The image forming unit 332 is configured to include a photosensitive drum, a charging device, an exposure device, a developing device, a transfer device, a cleaning device, and the like. The photosensitive drum is configured to rotate in the direction indicated by an arrow.

Specifically, the image forming unit 330 forms an image in the following order. The image forming unit 332K transfers a K-toner image onto the intermediate transfer belt 336. In the image forming unit 332K, the photosensitive drum is charged by the charging device. The exposure device exposes the charged photosensitive drum with light corresponding to a K-color image. In this way, an electrostatic latent image corresponding to the K-color image is formed on the photosensitive drum. The developing device develops the electrostatic latent image formed on the photosensitive drum with K-toner. The transfer device transfers the K-toner image formed on the photosensitive drum onto the intermediate transfer belt 336.

Similarly, the image forming unit 332C transfers a C-toner image onto the intermediate transfer belt 336. Moreover, the image forming unit 332M transfers an M-toner image onto the intermediate transfer belt 336. Moreover, the image forming unit 332Y transfers a Y-toner image onto the intermediate transfer belt 336. On the intermediate transfer belt 336, the toner images of K, C, M, and Y colors are superimposed so that an "overlapped toner image" is formed. The secondary transfer device 338 transfers the "overlapped toner image" on the intermediate transfer belt 336 onto a sheet at a time. The fixing device 339 fixes the "overlapped toner image" transferred onto the sheet at a time by heating.

The sheet supply unit 340 is configured to include a sheet storage unit 342 that stores sheets and a sheet supply mechanism that supplies sheets from the sheet storage unit 342 to the image forming unit 330. The sheet supply mechanism includes a pickup roller 344 that picks up a sheet from the sheet storage unit 342 and transport rollers 346. Plural sheet storage units 342 are provided depending on the type and the size of a sheet. In the present exemplary embodiment, the plural sheet storage units 342 include a sheet storage unit 342 that stores the code embedded sheet 50. The sheet supply unit 342 supplies various sheets including the code embedded sheet 50 to the image forming unit 330 using the above-mentioned configuration.

The sheet discharge unit 350 is configured to include a discharge unit 354 to which sheets are discharged, a discarding unit 356 to which unnecessary sheets are discarded, and a discharge mechanism for discharging sheets onto the discharge unit 354. The discharge mechanism is configured to include a transport path switching unit 352 that switches a sheet transport path in addition to the transport rollers 346 so that unnecessary sheets are discarded to the discarding unit 356. The sheet discharge unit 350 discharges sheets on which an image is formed by the image forming unit 330 to the discharge unit 354 when a document image is formed using the above-mentioned configuration. Moreover, when the forming of the document image is stopped, the sheet is discarded to the discarding unit 356.

The communication unit 370 is an interface for communicating with an external device via a wired or wireless communication circuit. For example, the communication unit 370 functions as an interface for communicating with a computer connected to a network such as a local area network (LAN). The communication unit 370 acquires print parameters from an external device such as the terminal device 20 and the document management server 40 together with a print instruction and the image information of an electronic document.

The print parameters are print attributes such as a page, the number of copies, a sheet size, the number of pages printed on one sheet, and a margin. In the present exemplary embodiment, whether or not to use the code embedded sheet 50 is also included in the print parameters. The image forming apparatus 30 selects the code embedded sheet 50 having a sheet size corresponding to the print parameters and forms a document image of an electronic document on the selected code embedded sheet 50.

The storage unit 380 includes a storage device such as a hard disk. Various data such as log data, a control program, and the like are stored in the storage unit 380. In the present exemplary embodiment, a case where a control program for a "printability checking process" described later is stored in advance in the storage unit 380 will be described. A control program stored in advance is read and executed by the CPU 300A. The control program may be stored in another storage device such as the ROM 300B.

In the present exemplary embodiment, plural code images are stored in advance in the storage unit 380 in correlation with a sheet size and a resolution. Further, "the reading unit" necessary for decoding a two-dimensional code included in a code image is stored in accordance with each of the plural code images. A predetermined code image is printed on the code embedded sheet 50 in accordance with the resolution of the image forming apparatus 30 and the sheet size. Thus, the code image printed on the code embedded sheet 50 is uniquely determined in accordance with the resolution of the image forming apparatus 30 and the sheet size.

The control unit 300 may be connected to various drives. The various drives are devices that read data from a computer-readable portable recording medium such as a flexible disk, a magneto-optical disc, or a CD-ROM and write data to the recording medium. When various drives are included, a control program may be recorded on the portable recording medium and the control program may be read by the corresponding drive and executed.

Here, the configuration of the specific sheet detecting unit 360 will be described in detail with reference to FIG. 6B. As illustrated in FIG. 6B, the specific sheet detecting unit 360 is disposed so as to face an image forming surface of a supplied sheet such as a surface on which the code image of the code embedded sheet 50 is formed. The specific sheet detecting unit 360 is configured to include an infrared light source 362 that irradiates infrared light onto the image forming surface of a sheet, an imaging optical system 364, and an image reading device 366 configured to read an infrared image. The image reading device 366 may be configured to include an infrared filter that transmits infrared light and an optical detector such as an image sensor that detects the light having passed through the infrared filter, for example.

When detecting the code embedded sheet 50, the infrared light source 362 is lit so that infrared light is irradiated on the image forming surface of a sheet. If the sheet is the code embedded sheet 50, the infrared light irradiated on a code image forming surface is partially absorbed by the sheet and the remaining portion of the light is reflected from the sheet. The reflection infrared light reflected from the image forming surface is imaged on a detection surface of the image reading device 366 by the imaging optical system 364. The image reading device 366 detects the reflection infrared light to read an infrared image on the code embedded sheet 50.

Moreover, the specific sheet detecting unit 360 may not need to read and decode the code image but may only need to acquire detection information for detecting the code embedded sheet 50. For example, in the code embedded sheet 50 on which an infrared image is formed, the intensity of reflection infrared light decreases as compared to a normal sheet. The code embedded sheet 50 may be detected from a change in intensity of the reflection infrared light. As will be described later, whether the code embedded sheet 50 is used or not may be known from print parameters. Thus, the code embedded sheet 50 may be detected based on print parameters.

Printability Checking Process

Next, a "printability checking process" will be described.

When the image forming apparatus 30 is instructed to print an electronic document, the image forming apparatus 30 acquires print parameters together with a print instruction and the image information of the electronic document. When "to use the code embedded sheet 50" is included in the print parameters, the image forming apparatus 30 selects the code embedded sheet 50 having a sheet size corresponding to the print parameters and forms a document image of the electronic document on the selected code embedded sheet 50. In this case, the code embedded sheet 50 is supplied from the sheet supply unit 342.

When the code embedded sheet 50 is supplied, the code embedded sheet 50 is detected by the specific sheet detecting unit 360. When the code embedded sheet 50 is detected, the image forming apparatus 30 executes the "printability checking process" described below before forming the document image. Moreover, when it is predicted that an "undecodable area" will be generated in a printed material, a warning message of the note is sent to the user so that the user performs a prevention process of stopping the forming of the document image or the like.

Overview of Printability Checking Process

Figure 8:
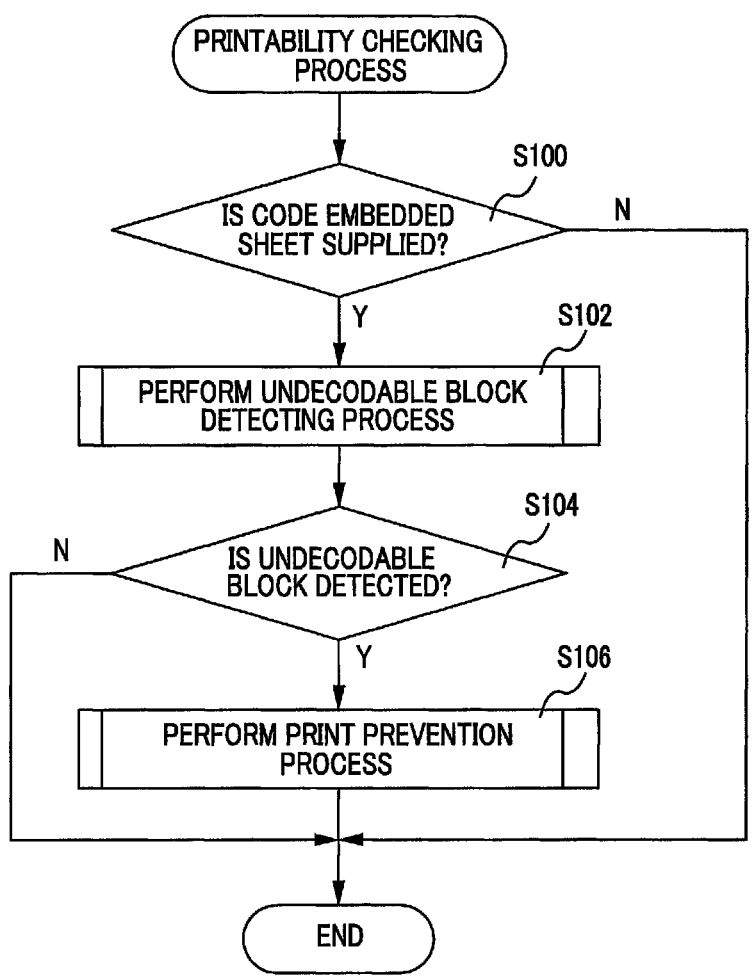
FIG. 8 is a flowchart illustrating a processing routine of a "printability checking process"

FIG. 8 is a flowchart illustrating a processing routine of the "printability checking process." The printability checking process is executed by the CPU 300B of the image forming apparatus 30. Moreover, the printability checking process is started when the code embedded sheet 50 is detected in the sheet transport path by the specific sheet detecting unit 360 (that is, when detection information is acquired).

First, in step S100, it is determined whether the code embedded sheet 50 is supplied from the sheet supply unit 340 based on the detection information acquired from the specific sheet detecting unit 360. The flow proceeds to step S102 when a positive determination result is obtained, and this routine ends when a negative determination result is obtained. In step S102, the "undecodable block detecting process" is executed. In the undecodable block detecting process, the document image acquired by the image forming apparatus 30 is divided into plural blocks, and an "undecodable block" is detected from the plural blocks.

Subsequently, in step S104, it is determined whether the "undecodable block" is detected based on the detection result. The flow proceeds to step S106 when a positive determination result is obtained, and this routine ends when a negative determination result is obtained. In step S106, the "print prevention process" is executed, and this routine ends. In the print prevention process, a setting screen that displays a warning message indicating "an undecodable area will be generated" and options as to whether forming of a document image will be executed or stopped is displayed on the operation display unit of the image forming apparatus 30. In the case of a document image having an undecodable area, the user is prompted to prevent printing with the above-mentioned warning message.

Undecodable Block Detecting Process

Figure 9:
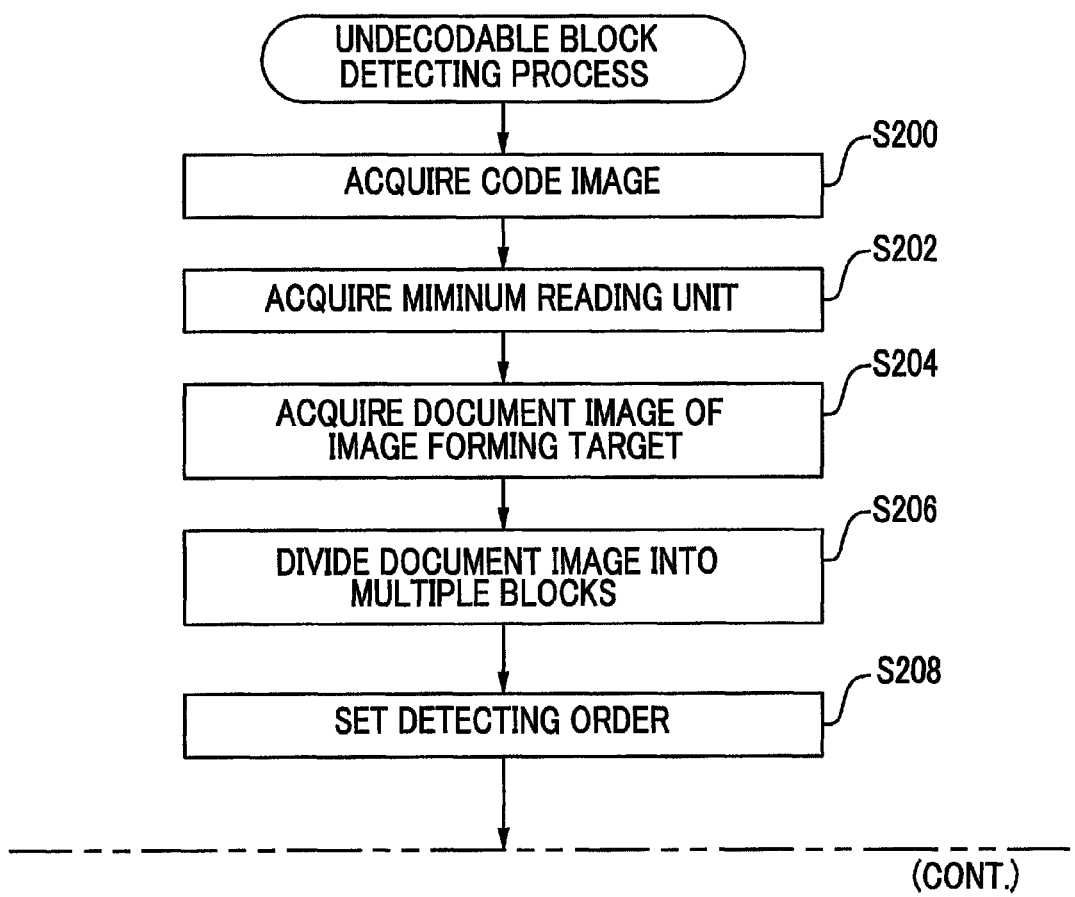
FIG. 9 is a flowchart illustrating a processing routine of an "undecodable block detecting process"

Next, the "undecodable block detecting process" will be described. FIG. 9 is a flowchart illustrating a processing routine of the "undecodable block detecting process."

First, in step S200, a code image corresponding to setting information is acquired from plural code images stored in the storage unit 380 based on the acquired print parameters (setting information such as a sheet size). In this way, a code image corresponding to the code embedded sheet 50 on which the document image is printed is acquired. The acquired code image is stored in the RAM 300C and read as necessary.

Subsequently, in step S202, the "reading unit" stored in the storage unit 380 is acquired in accordance with the acquired code image. The acquired reading unit is stored in the RAM 300C and read as necessary. In the present exemplary embodiment, the code image is an image in which plural code patterns 52 which are "reading units" are arranged. The acquired code image is divided in advance into plural blocks having the size (for example, 60 pixels by 60 pixels) of the code pattern 52.

Subsequently, in step S204, a document image of an electronic document serving as an image formation target is acquired. The acquired document image is stored in the RAM 300C and read as necessary. The document image of the electronic document serving as an image formation target is acquired via the communication unit 370. For example, when the document image is acquired as PDL data (data described in a page description language), the document image is converted into decompressed bitmap raster data, and image data of an RGB format is color-converted into image data of a CMYK format, whereby the image data of the CMYK format is acquired. A "color conversion table" used for performing a color conversion process is prepared depending on a color space expressed by the image forming apparatus 30. The color conversion table is stored in advance in the storage unit 380 or the like.

Subsequently, in step S206, the acquired document image is divided into plural "blocks" corresponding to reading unit based on the reading unit of the code image. For example, when one page of document image is formed on the code embedded sheet 50, the document image has the same size as the code image. In this case, the acquired document image is divided into plural blocks having the same size of the code pattern 52 similarly to the acquired code image. Moreover, when N pages of document image are formed on the code embedded sheet 50, the size of blocks for the acquired document image is changed in accordance with the magnification of the formed image. For example, when two pages of document image are formed on the code embedded sheet 50 with the magnification of respective document images set to ½, the document image is divided into plural blocks having the size twice (about 1.41×1.41) of the code pattern 52.

Subsequently, in step S208, a detection order for detecting the "undecodable block" is set with respect to the plural blocks of the document image. For example, when forming an image, image formation is performed in a predetermined order such that the horizontal direction is a main scanning direction when a sheet is viewed in top view, and the arrangement direction of sub-scanning lines is a sub-scanning direction. First, one line of main scanning is performed from left to right. Subsequently, main scanning is performed on the next line by moving in the sub-scanning direction. The detection order may be the same order as the scanning order during the image formation. The set detection order is stored in the RAM 300C and read as necessary.

In the present exemplary embodiment, the code image is printed on the entire surface of the code embedded sheet 50, and the code image is made up of plural code patterns 52. Thus, each of the plural blocks of the document image overlaps with the code patterns 52 of the code image. In contrast, when a code image is printed in a portion of the code embedded sheet 50, for example, a portion of the plural blocks of the document image does not overlap with the code patterns 52. In this case, the detection order may be set for the block overlapping with the code patterns 52 of the code image among the plural blocks of the document image.

Subsequently, in step S210, it is determined whether a black pixel is included in the first block of the document image. Whether a black pixel is included in the block is determined based on color information possessed by the respective pixels in the block. For example, when a document image is image data of the CMYK format, it may be determined whether a pixel (a pixel in which a K-colorant is used for printing) having color information (K>0) is included in the block. When the pixels having the color information (K>0) are abundant, a threshold value may be provided to the K value, and a pixel having the color information that the K value is the threshold value or smaller may be defined as a black pixel.

Moreover, when a document image is expressed as image data of the RGB format, respective pixels in the block have color information representing the brightness of the respective RGB colors by the gradation number. When the respective RGB colors are displayed with 256 gradations, the black pixel has color information of (R=0, G=0, and B=0). In this case, it may be determined whether a pixel having the color information (R=0, G=0, and B=0) is included in the block. Alternatively, a threshold value may be provided to each of the R, G, and B values, and a pixel having the color information that the R, G, and B values have the threshold values or smaller may be defined as the black pixel.

When the document image includes a black image portion, and the black image portion is formed using a black colorant, a black image is superimposed on the code image. In a portion in which a black image is superimposed on the code image, the code image and code information are not readable, and such a portion is referred to as an "undecodable area" where the specific information is not decodable. Thus, when a black pixel is included in a block, a positive determination result is obtained in step S210, and the flow proceeds to step S212. In step S212, the block including the black pixel is determined to be the "undecodable block." That is, the undecodable block is detected. The determination result is stored in the RAM 300C and read as necessary. On the other hand, when a black pixel is not included in a block, a negative determination result is obtained in step S210, and the flow proceeds to step S214.

Subsequently, in step S214, it is determined whether a black pixel is included in the next block of the document image. When a black pixel is included in the block, a positive determination result is obtained in step S214, and the flow proceeds to step S216. In step S216, the block including the black pixel is determined to be the "undecodable block." That is, the undecodable block is detected. The determination result is stored in the RAM 300C and read as necessary. On the other hand, when a black pixel is not included in a block, a negative determination result is obtained in step S214, and the flow proceeds to step S218.

Subsequently, in step S218, it is determined whether the undecodable block has been detected for all detection target blocks. When a negative determination result is obtained, the flow returns to step S214, and the detection of the undecodable block is performed repeatedly. On the other hand, when a positive determination result is obtained, the flow proceeds to step S220. Subsequently, in step S220, the determination result is stored in the RAM 300C, and this routine ends. The "undecodable block" is detected from all blocks of the document image and is stored as the result of the detection for the document image.

Here, the content of the "undecodable block detecting process" will be described visually.

Figure 10A:
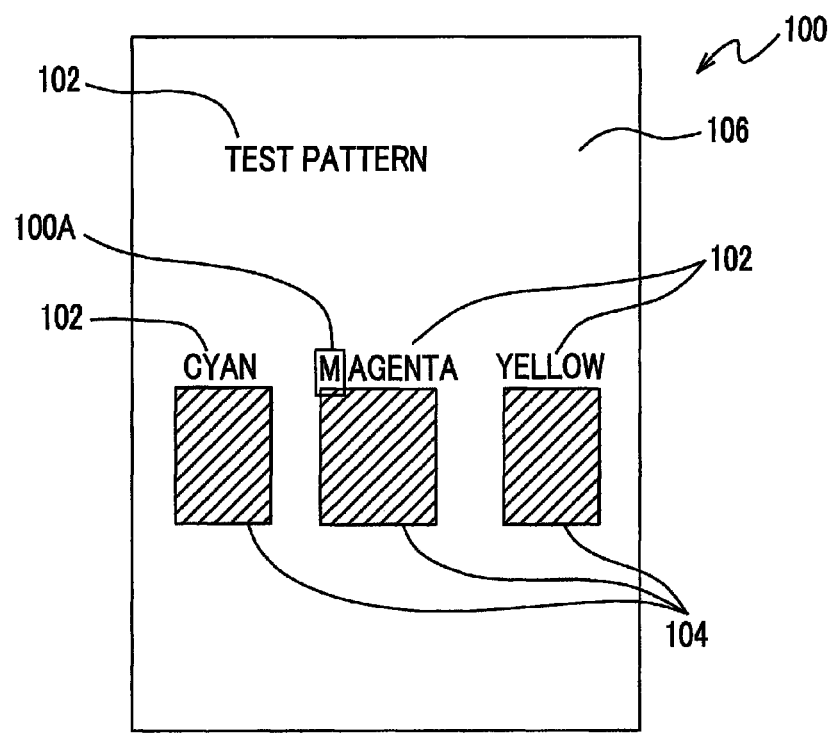
FIG. 10A is a plan view illustrating an example of a document image.

FIG. 10A is a plan view illustrating an example of a document image. In this example, a case where the document image is a "color chart for color adjustment" will be described. As illustrated in FIG. 10A, a document image 100 illustrated includes black character images 102 such as "test pattern" and graphic images 104 of the C, M, and Y colors. The document image 100 is made up of an image portion of the character images 102 and the graphic images 104 and a background portion 106 that serves as the background of the image. The graphic images 104 are so-called "test patches" and are rectangular solid images of the C, M, and Y colors.

Figure 10B:
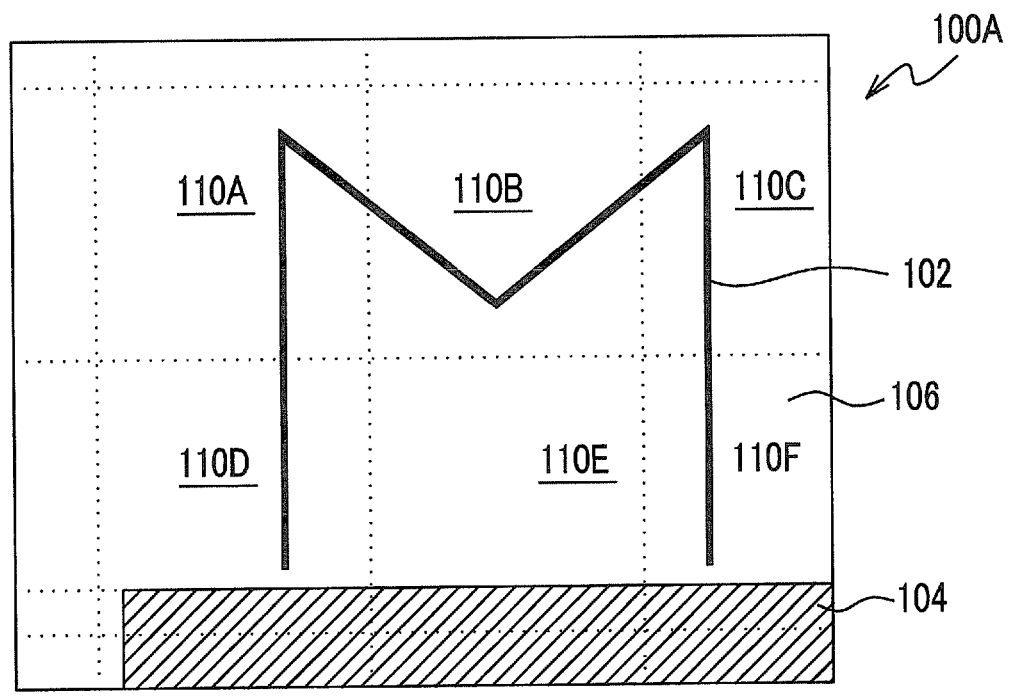
FIG. 10B is a partially enlarged view illustrating a portion of a document image at an enlarged scale.

FIG. 10B is a partially enlarged view illustrating a portion 100A of the document image 100 at an enlarged scale. As illustrated in FIG. 10B, in the portion 100A approximately at the center of the document image 100, a black character image 102 of the character "M" of the character string "MAGENTA" and a portion of the M-color graphic image 104 are disposed. In the undecodable block detecting process, the document image is divided into plural blocks corresponding to the reading unit. Symbols are assigned to major blocks so that the portion 100A of the document image 100 includes blocks 110A, 110B, 110C, 110D, 110E, and 110F.

Figure 11:
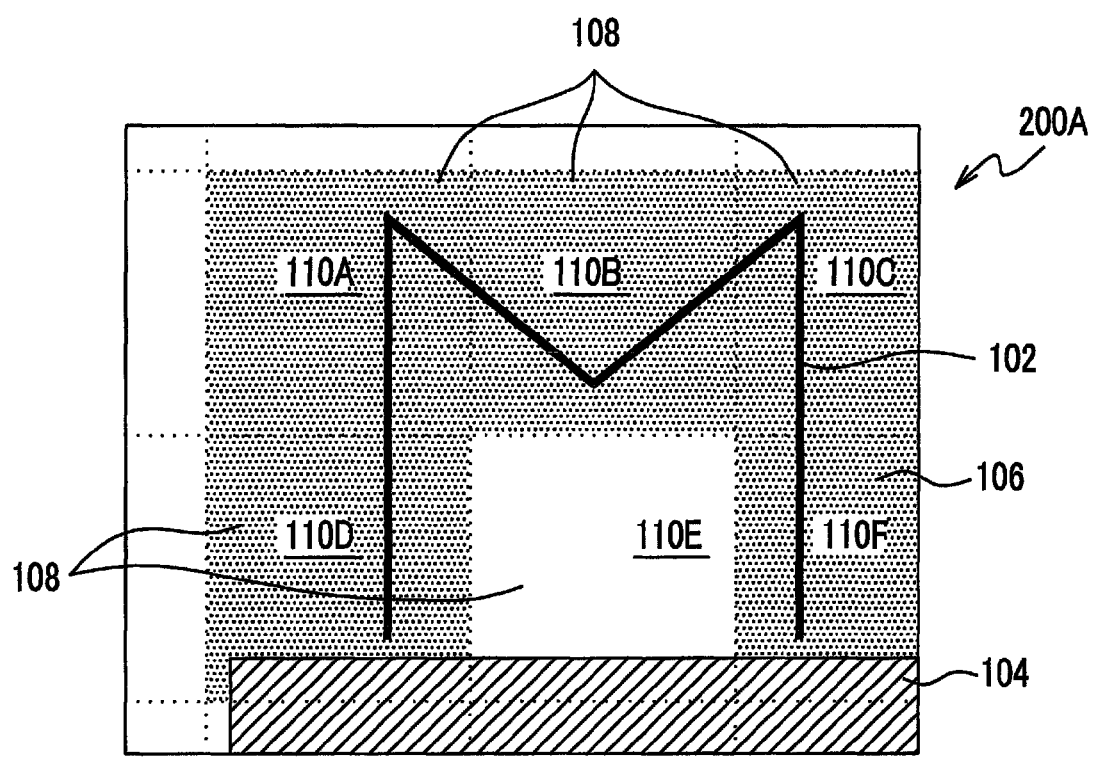
FIG. 11 is a partially enlarged view illustrating a detection result of an undecodable block.

FIG. 11 is a partially enlarged view illustrating a detection result of the undecodable block. That is, FIG. 11 is a partially enlarged view illustrating a portion 200A of the document image (hereinafter referred to as a "preview image") representing a determination result at an enlarged scale. The preview image portion 200A corresponds to the portion 100A of the document image 100. In the undecodable block detecting process, an undecodable block 108 is detected as displayed in a gray color. In this example, the blocks 110A, 110B, 110C, 110D, and 110F overlap with the black character image 102 and include a black pixel within the blocks. Thus, the blocks 110A to 110D and 110F are detected as the undecodable block 108. The block 110E does not correspond to the undecodable block.

Print Prevention Process

Figure 12:
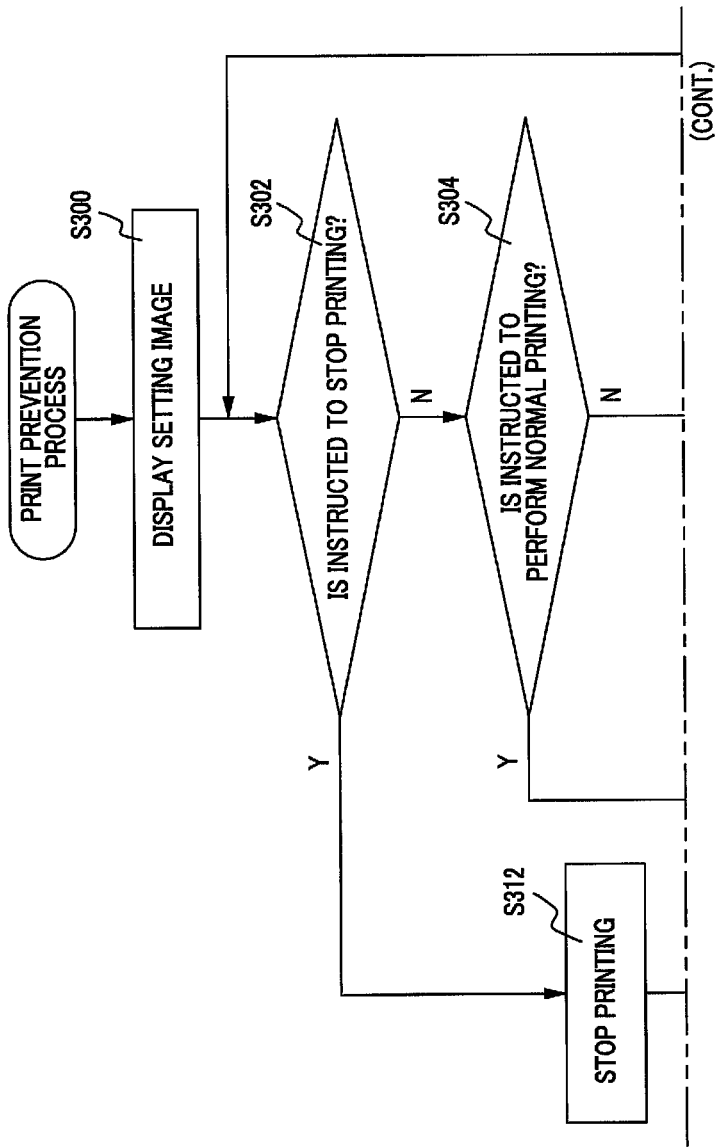
FIG. 12 is a flowchart illustrating a processing routine of a "print prevention process"

Next, the "print prevention process" will be described. FIG. 12 is a flowchart illustrating a processing routine of the "print prevention process." As illustrated in FIG. 8, the print prevention process is executed when the "undecodable block" is detected within a document image.

The document image and the detection result of the undecodable block are already acquired in the undecodable block detecting process and are stored in the RAM 300C of the control unit 300. The document image is stored in the RAM 300C as the image data (CMYK data) of the CMYK format. Moreover, in the present exemplary embodiment, a "second color conversion table" for converting the CMYK data into CMY data is stored in the storage unit 380 of the image forming apparatus 30.

First, in step S300, the operation display unit 320 is instructed to display a setting screen. A warning message indicating the generation of an undecodable area and options as to whether forming of a document image will be executed or stopped are displayed in the setting screen displayed on the operation display unit 320.

Figure 13:
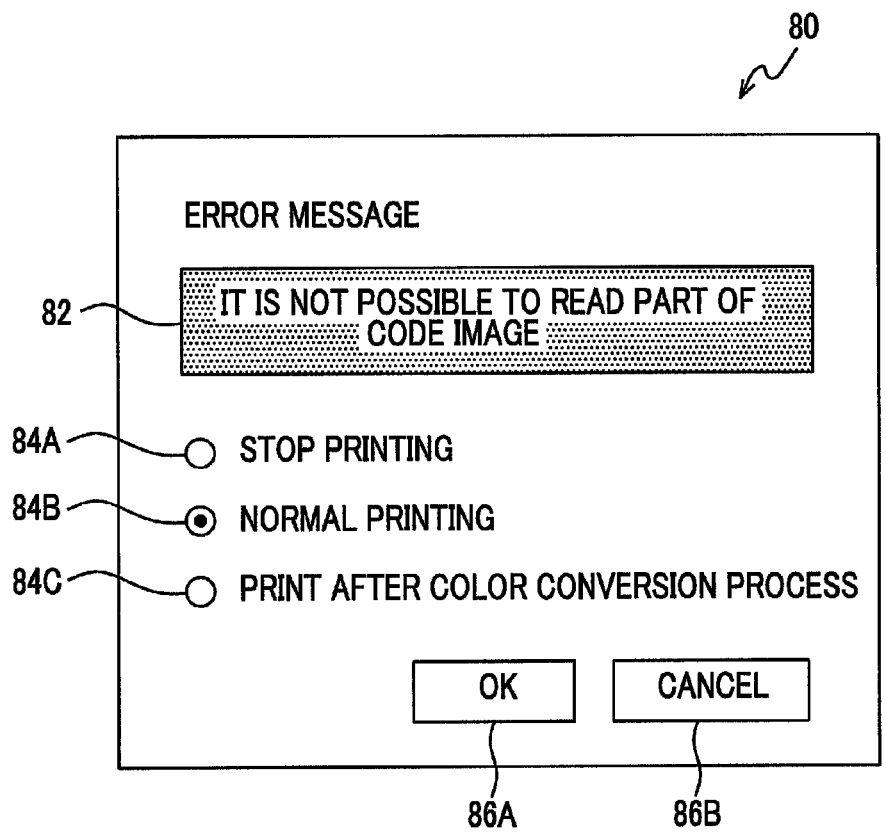
FIG. 13 is a schematic view illustrating an example of a settings screen.

FIG. 13 is a schematic view illustrating an example of the setting screen. The setting screen 80 includes a display portion 82 that displays an error message (warning) such as "It is not possible to read a portion of a code image," a selecting portion 84A for selecting "stop printing," a selecting portion 84B for selecting "normal printing," a selecting portion 84C for selecting "print after color conversion process," an instructing portion 86A for instructing "start (OK)," and an instructing portion 86B for instructing "stop (Cancel)." In the following description, the selecting portions 84A, 84B, and 84C will be collectively referred to as a "selecting portion 84" when they do not need to be distinguished.

When the user operates the operation display unit 320 to input information to respective portions of the setting screen 80, setting information and instruction information are acquired. When any one of "stop printing," "normal printing," and "print after color conversion process" is selected using the selecting portion 84, and "start" is instructed using the instructing portion 86A, whereby the setting information and the instruction information are acquired, and the flow proceeds to the next step S302.

Subsequently, in step S302, it is determined whether it is instructed to "stop printing" based on the setting information. The flow proceeds to step S304 when a negative determination result is obtained, and the flow proceeds to step S312 when a positive determination result is obtained. In step S304, it is determined whether it is instructed to perform "normal printing" based on the setting information. The flow proceeds to step S306 when a negative determination result is obtained, and the flow proceeds to step S314 when a positive determination result is obtained.

In step S306, it is determined whether it is instructed to "print after color conversion process" based on the setting information. The flow proceeds to step S308 when a positive determination result is obtained, and the flow returns to step S302 and the determination is repeated when a negative determination result is obtained. When a negative determination result is obtained in step S306, the routine may end after a predetermined period has elapsed.

In step S312, since it is instructed to "stop printing," the respective units are instructed to stop printing, and this routine ends. In this case, a document image having an undecodable area is not printed.

For example, the image forming unit 330 is instructed not to form any image on the code embedded sheet 50. Then, the image forming unit 330 does not form any image on the supplied code embedded sheet 50. Moreover, the sheet discharge unit 350 is instructed to discard the code embedded sheet 50. In the sheet discharge unit 350, the transport path is switched by the transport path switching unit 352, and the code embedded sheet 50 on which no image is formed is discarded to the discarding unit 356.

In step S314, since it is instructed to perform "normal printing," the respective units are instructed to execute printing of the acquired document image, and this routine ends. In this case, a document image having the undecodable area is printed as it is. Thus, in the undecodable area, the code image and the code information are not readable and the specific information is not decodable.

For example, the image forming unit 330 is instructed to form a document image on the code embedded sheet 50. Then, the image forming unit 330 forms a document image on the supplied code embedded sheet 50 based on the CMYK data. Moreover, the sheet discharge unit 350 is instructed so that the code embedded sheet 50 on which the document image is formed is discharged to the discharge unit 354. In the sheet discharge unit 350, the code embedded sheet 50 on which the document image is formed is discharged to the discharge unit 354.

In step S308, since it is instructed to "print after color conversion process," a color conversion process is executed on the acquired document image. The "second color conversion table" is read from the storage unit 380, and a color conversion process is performed depending on whether each of the blocks of the document image is the "undecodable block." That is, a color conversion process of converting the document image from the CMYK data to the CMY data is executed on the undecodable block of the document image.

Subsequently, in step S310, the respective units are instructed to print the document image after color conversion process and this routine ends. For example, the image forming unit 330 is instructed to form the document image after color conversion process on the code embedded sheet 50. The image forming unit 330 forms the document image after color conversion process on the supplied code embedded sheet 50. Moreover, the sheet discharge unit 350 is instructed so that the code embedded sheet 50 on which the document image is formed is discharged to the discharge unit 354. In the sheet discharge unit 350, the code embedded sheet 50 on which the document image is formed is discharged to the discharge unit 354.

In this case, the document image having the undecodable area is converted into a document image without the undecodable area and is then printed. In the image data of the CMYK format, the respective pixels have color information representing a color-mixing ratio of the respective CMYK colors. In contrast, in the image data of the CMY format, the respective pixels have color information representing a color-mixing ratio of the respective CMY colors. Thus, when the document image is formed, in blocks corresponding to the "undecodable block," black is expressed by a mixed color of the C, M, and Y colorants which do not absorb infrared light. In this way, the code image may be read and decoded.

Here, the content of the "color conversion process" will be described visually.

Figure 14:
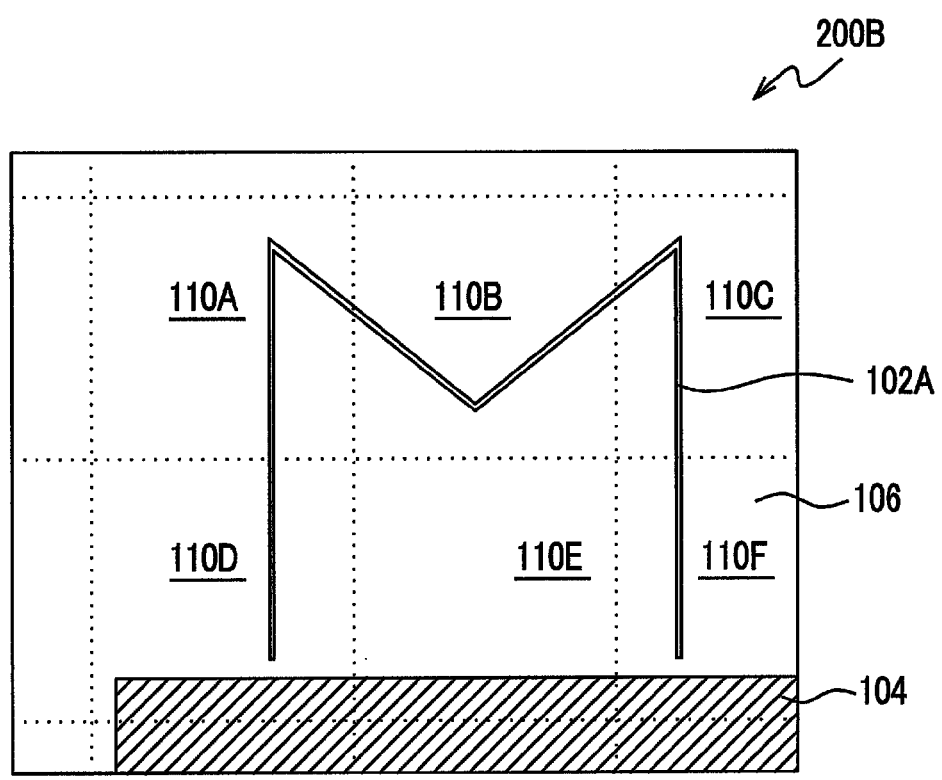
FIG. 14 is a partially enlarged view illustrating a portion of a document image after color conversion process at an enlarged scale.

FIG. 14 is a partially enlarged view illustrating a portion 200B of a document image (print image) after color conversion process at an enlarged scale. The print image portion 200B corresponds to the portion 100A of the document image 100. In the color conversion process, the CMYK data of the "undecodable block" of the document image is converted into CMY data. In this example, the blocks 110A to 110E are the "undecodable blocks." The CMYK data of the blocks 110A to 110E are color-converted into the CMY data. As illustrated in FIG. 14, in the print image portion 200B, the black character image 102 of the document image 100 illustrated in FIG. 10B is printed as a character image 102A of a color different from black such as violet or blue.

Although an example in which the CMYK data of the "undecodable block" is color-converted into the CMY data, and blocks other than the "undecodable block" are not color-converted has been described, the CMYK data of all of the blocks of the document image may be converted into the CMY data.

Modification Example

In the above exemplary embodiment, although the "code pattern" including plural unit patterns has been described as the reading unit, the "unit pattern" may be the reading unit. The reading unit may have a size or an area necessary for decoding specific information and may be set depending on the amount of information of the specific information. For example, even when the "unit pattern" according to the present exemplary embodiment is used as the reading unit, specific information of 5 bits or more is held.

In the above exemplary embodiment, an example in which a dot code called "$_9C_2$ pattern" that uses a specific unit pattern is used as the dot code that constitutes the code image has been described. However, the size of the unit pattern, the arrangement of dots, the number of selected dots, and the like may be changed appropriately. Moreover, a dot code of a different system may be used. FIGS. 15A to 15D are schematic views illustrating existing dot codes of the related art. These existing dot codes of the related art may be used. The "reading unit" necessary for decoding the specific information is set depending on the type of dot codes and the amount of information of the specific information.

Figure 15A:
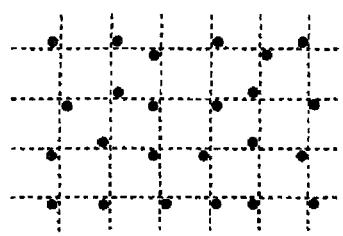
FIGS. 15A to 15D are schematic views illustrating existing dot codes of the related art.
Figure 15B:
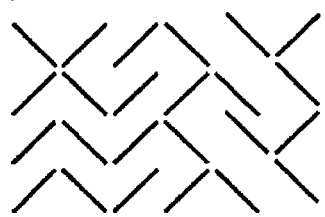

In the dot code illustrated in FIG. 15A, a virtual grid frame is disposed, and one dot is disposed at any one of four areas divided by the intersecting points of this grid. In this way, four patterns may be expressed, and two bits may be expressed (see JP-T-2003-511762). Moreover, in the dot code illustrated in FIG. 15B, one bit is expressed using V-shaped straight lines called glyphs (see JP-A-9-185669). Each of the V-shaped straight lines is made up of plural dots.

Figure 15C:
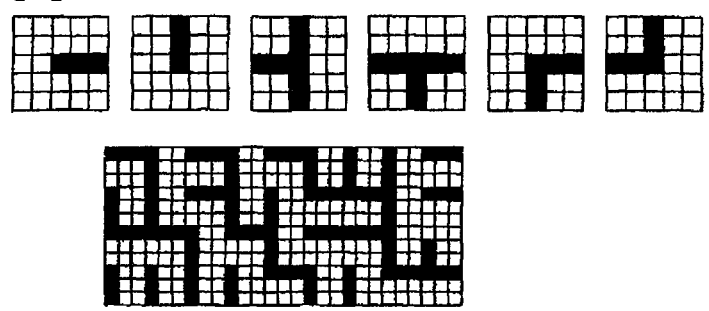
Figure 15D:
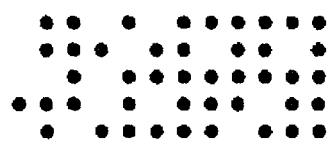

In the dot code illustrated in FIG. 15C, information is expressed using a combination of linear graphic patterns and key-shaped graphic patterns (see JP-A-2004-152273). The respective patterns are made up of plural dots. Moreover, in the dot code illustrated in FIG. 15D, information is expressed by on and off of dots (see Japanese Patent No. 2833975).

Moreover, in the above exemplary embodiment, although an example of acquiring an electronic document stored in advance in an external device or the like and the document image thereof has been described, the electronic document and the document image thereof may be acquired using another method. For example, a document image read by an image reading device such as a scanner unit of the image forming apparatus may be used. For example, when a document image is printed on a code embedded sheet using ink including a K-colorant, the printed document image may be read by an image reading device to acquire the document image. After that, a color conversion process may be performed on an undecodable block of the acquired document image (the document image having an undecodable area), and the document image after the color conversion process (the document image without the undecodable area) may be printed.

Moreover, in the above exemplary embodiment, although an example in which a block including a black pixel is determined to be the "undecodable block" has been described, the present invention is not limited to this. As described above, when a code image is formed using a colorant having a predetermined absorption wavelength, and an image portion that uses a color having an absorption band at the same absorption wavelength is superimposed on the code image, the image portion becomes the "undecodable area" where the code image is not readable. In this case, depending on the color of a colorant that forms a code image, a block including a pixel of the color that makes reading of the code image impossible is referred to as the "undecodable block."

The configurations of the image forming system, the image forming apparatus, and the program described in the respective exemplary embodiments are exemplary, and the configurations may be naturally modified without departing from the spirit of the present invention. For example, all or part of the steps of the program may be executed by the circuits corresponding to the steps. Moreover, the order of all or part of the steps of the program may be changed.

The foregoing description of the exemplary embodiments of the present invention has been provided for the purposes of illustration and description. It is not intended to be exhaustive or to limit the present invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image determination device comprising:
    a sheet detecting unit that detects a sheet on which a code image is printed from sheets supplied to a transport path to form an image thereon;
    a first acquiring unit that acquires information on the code image printed on the sheet and an absorption wavelength of the code image;
    a second acquiring unit that acquires a reading unit necessary for decoding a code portion of the code image;
    a third acquiring unit that acquires a document image of an electronic document serving as an image formation target;
    a dividing unit that divides the document image acquired by the third acquiring unit into a plurality of blocks corresponding to the reading unit based on the reading unit of the code image acquired by the second acquiring unit;
    a detecting unit that detects an undecodable block based on the information of the code image acquired by the first acquiring unit, wherein the undecodable block comprises a block that contains an image portion of the document image that uses a color having an absorption band at the absorption wavelength of the code image and that contains the code portion of the code image;
    an output unit that outputs a warning indicating the generation of an undecodable area based on a result of the detection by the detecting unit,
    wherein, when the undecodable block is detected, a color conversion unit performs a color conversion process on the document image so that image portion of the document image that uses a color having an absorption band at the absorption wavelength of the code image is formed using a colorant that is devoid of an absorption band at the absorption wavelength of the code image.

2. The image determination device according to claim 1, wherein
    the code image contains an infrared absorbing material, and
    the image portion that uses a color having an absorption band at the absorption wavelength of the code image is a black image portion that is formed using a black colorant that absorbs an infrared light.

3. The image determination device according to claim 2, wherein
    the image portion that uses a color having an absorption band at the absorption wavelength of the code image is determined based on color information of respective pixels of the document image.

4. The image determination device according to claim 1, wherein
    the image portion that uses a color having an absorption band at the absorption wavelength of the code image is determined based on color information of respective pixels of the document image.

5. An image forming apparatus comprising:
    the image determination device according to claim 1;
    a receiving unit that receives an instruction (a) to execute image formation of the document image or an instruction (b) to stop image formation of the document image when the output unit outputs the warning; and
    an image forming unit that forms the document image on the sheet in response to reception of the instruction (a).

6. The image forming apparatus according to claim 5, wherein the color conversion unit that performs a color conversion process on the document image so that a black image portion of the document image is formed using a colorant that poorly absorbs an infrared light when the code image contains an infrared absorbing material, and the undecodable block is detected,
    wherein the receiving unit receives an instruction (a) to execute image formation of the document image, an instruction (b) to stop image formation of the document image, or an instruction (c) to execute image formation of the document image after the color conversion process is performed by the color conversion unit, and
    wherein the image forming unit forms the image of the document image after the color conversion process on the sheet in response to reception of the instruction (c).

7. The image forming apparatus according to claim 5, wherein
    the code image contains an infrared absorbing material, and
    the image portion that uses a color having an absorption band at the absorption wavelength of the code image is a black image portion that is formed using a black colorant that absorbs an infrared light.

8. The image forming apparatus according to claim 5, wherein
    the image portion that uses a color having an absorption band at the absorption wavelength of the code image is determined based on color information of respective pixels of the document image.

9. The image fanning apparatus according to claim 5, wherein
    the code image is made up of a plurality of code patterns arranged in a two-dimensional form.

10. The image forming apparatus according to claim 5, wherein
    the code image is an infrared image.

11. The image determination device according to claim 1, wherein
    the code image is made up of a plurality of code patterns arranged in a two-dimensional form.

12. The image determination device according to claim 1, wherein
    the code image is an infrared image.

* * * * *